(12) United States Patent
Zumwalt et al.

(10) Patent No.: US 12,142,156 B1
(45) Date of Patent: Nov. 12, 2024

(54) AUTOMATED MOVING TARGET APPARATUS

(71) Applicant: Jordan Dean Zumwalt, Roseville, CA (US)

(72) Inventors: Jordan Dean Zumwalt, Roseville, CA (US); Jonathan Carlo Fragoso, Commerce City, CO (US)

(73) Assignee: Jordan Zumwalt, Roseville, CA (US)

( * ) Notice: Subject to any disclaimer, the term of this patent is extended or adjusted under 35 U.S.C. 154(b) by 0 days.

(21) Appl. No.: 18/648,327

(22) Filed: Apr. 26, 2024

Related U.S. Application Data (63) Continuation-in-part of application No. 18/376,781, filed on Oct. 4, 2023.

(51) Int. Cl.
| | | |
|---|---|---|
| *F41J 9/00* | (2006.01) | |
| *F41J 1/10* | (2006.01) | |
| *F41J 9/02* | (2006.01) | |
| *G09B 19/00* | (2006.01) | |
| *F41J 5/056* | (2006.01) | |

(52) U.S. Cl.
CPC ............ *G09B 19/0038* (2013.01); *F41J 1/10* (2013.01); *F41J 9/00* (2013.01); *F41J 9/02* (2013.01); *F41J 5/056* (2013.01)

(58) Field of Classification Search
None
See application file for complete search history.

(56) References Cited

U.S. PATENT DOCUMENTS

| | | | |
|---|---|---|---|
| 3,531,120 A | 9/1970 | Ross et al. | |
| 4,655,442 A | 4/1987 | Laukenmann et al. | |
| 5,063,334 A | 11/1991 | Tanita et al. | |
| 5,431,409 A | 7/1995 | Webster | |
| 5,499,552 A | 3/1996 | Yanagisawa | |
| 7,201,376 B2* | 4/2007 | Kuosa | F41J 7/04 273/392 |
| 8,286,968 B2 | 10/2012 | Duerr | |
| 8,529,382 B2 | 9/2013 | Green et al. | |
| 9,360,283 B1 | 6/2016 | Tejada et al. | |
| 9,915,507 B1 | 3/2018 | Cummins | |
| 10,669,090 B2 | 6/2020 | Conway | |
| 2013/0056934 A1 | 3/2013 | Kipp | |
| 2015/0276356 A1* | 10/2015 | Cesternino | F41J 1/10 273/370 |
| 2018/0202777 A1* | 7/2018 | Green | G05B 19/042 |
| 2023/0033184 A1* | 2/2023 | Edwards | F41J 9/02 |

FOREIGN PATENT DOCUMENTS

| | | |
|---|---|---|
| CH | 9915507 A5 | 9/1976 |
| CN | 115120946 A | 9/2022 |
| DE | 10017293 A1 | 11/2001 |
| EP | 1088617 A1 | 4/2001 |
| GB | 2500182 A | 9/2013 |
| KR | 200415230 Y1 | 4/2006 |

\* cited by examiner

*Primary Examiner* — Jason T Yen
(74) *Attorney, Agent, or Firm* — The Myers Law Group; Justin G. Sanders (57) ABSTRACT

An automated moving target apparatus is disclosed. In at least one embodiment, the apparatus provides at least one target to train for real life scenarios by mimicking human motion along two axes and improving reaction time, accuracy, and building muscle memory.

20 Claims, 4 Drawing Sheets

AUTOMATED MOVING TARGET APPARATUS

RELATED APPLICATIONS

This is a continuation-in-part application and so claims the benefit pursuant to 35 U.S.C. § 120 of a prior filed and co-pending U.S. non-provisional patent application Ser. No. 18/376,781, filed on Oct. 4, 2023. The contents of the aforementioned application are incorporated herein by reference.

BACKGROUND

The subject of this patent application relates generally to target practice systems, and more particularly to a high-performance automated moving target apparatus that is configured to mimic unpredictable human motion for applications in real-life scenarios.

Applicant(s) hereby incorporate herein by reference any and all patents and published patent applications cited or referred to in this application.

By way of background, many individuals use projectile weapons to engage in shooting sports or carry such weapons in an official capacity (e.g., law enforcement, military, etc.). Many of those individuals often wish to improve their accuracy in training scenarios that are similar to real life scenarios. For example, an individual with a practice partner may engage in paintball training to improve their accuracy in the field. However, a practice partner is not always available for a person seeking to train. The person would then need to train on their own and may employ some items, like targets, to assist in the training. However, the existing options for providing real life scenarios to train an individual without a practice partner are severely limited. Some of the existing options include life-like targets-targets that are made to look like real life targets. However, most of the existing target options in the market are positioned targets that are placed at a particular position in the field, but are static, non-moving targets. These targets do not help a person develop reaction time, muscle memory, or other intangibles often needed in real life scenarios. In particular, there is no target in the market that mimics human movement, both horizontally and vertically, in a consistent or random (unpredictable) pattern.

For an individual who wishes to practice real life scenarios, the existing target options are ineffective because they do not move in any realistic manner. As such, they fail to simulate or even approximate real life scenarios. Most targets in real life scenarios are capable of movement and are highly unpredictable. For example, a person playing paintball cannot predict the movements of opposing players. The existing options, for individuals seeking to improve their accuracy with a weapon or other projectile device, are lacking in their ability to improve life-like accuracy due to several factors including, without limitation, failure to develop muscle memory and inability to increase reaction time. Consequently, individuals who train with the existing non-moving targets only develop their (static) positional memory of immobile targets but fail to improve their accuracy in real life scenarios in which targets are typically mobile and unpredictable.

Therefore, what is needed is a mobile (moving) target to train for real life scenarios which is capable of mimicking human motion and improving reaction time, accuracy, and building muscle memory of a person practicing. Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing an automated moving target apparatus. In at least one embodiment, the apparatus provides a frame and a drivetrain engaged with the frame. The drivetrain assembly provides: a first motor mounted to the frame in a position proximal to a right side of the frame, the first motor providing a first motor wheel capable of selectively rotating in each of a first rotational direction and an opposing second rotational direction; a second motor mounted to the frame in a position proximal to a laterally opposing left side of the frame, the second motor providing a second motor wheel capable of selectively rotating in each of the first and second rotational directions; a substantially horizontally oriented lateral drivetrain bar extending between the first motor and the second motor; a carrier slidably engaged with the lateral drivetrain bar and configured for slidably traversing along the lateral drivetrain bar between the first motor and the second motor; a substantially vertically oriented vertical drivetrain bar slidably engaged with the carrier, such that the vertical drivetrain bar is oriented substantially transverse to the lateral drivetrain bar and configured for slidably traversing relative to the carrier in a substantially vertical direction; each of an upper end and an opposing lower end of the vertical drivetrain bar providing an at least one pulley, and the carrier providing at least four pulleys, said pulleys being positioned in a vertically oriented plane in which the first motor wheel and second motor wheel are also positioned; and a continuous belt engaged about each of the pulleys along with the first motor wheel and second motor wheel in series. A pivot arm is engaged with the upper end of the vertical drivetrain bar and provides an at least one target engaged therewith. During use of the apparatus, the first motor and second motor are capable of cooperating, via the belt, to selectively move the pivot arm—and, in turn, the at least one target—along each of a substantially horizontally oriented X-axis and a substantially vertically oriented Y-axis relative to the frame by rotating the respective first and second motor wheels In some embodiments, the apparatus is configured to mimic unpredictable human motion for applications in real-life scenarios by way of a self-propelled, electric target positioning device that is capable of rapid and precise movements in two axes to maneuver a target for the purpose of enhancing the training involved in various shooting activities.

In some embodiments, the apparatus comprises a frame, a drivetrain assembly, a target arm, a cover, and a controller. In some embodiments, the apparatus is powered by a power source. In some embodiments, the apparatus further comprises a target head, a target, a pivot arm, a pivot bracket, a quick-release pin, a pulley system, a plurality of fasteners that secure the cover to the frame, an electronics enclosure, a plurality of control buttons, a circuit panel, a battery pack dock, and a battery.

In some embodiments, the drivetrain assembly is a two-axis, quad-rail mechanism comprising a lateral drivetrain bar and a vertical drivetrain bar. In some embodiments, the drivetrain assembly comprises at least one electric motor, a pulley system, and a belt of the pulley system. In some embodiments, the drivetrain assembly attaches to the frame and the electric motor is configured to drive the belt of the pulley system to vertically move the lateral drivetrain bar and laterally move the vertical drivetrain bar. In some embodiments, the drivetrain assembly comprises two electric motors attached to opposing ends of the lateral drivetrain bar. In some embodiments, the pulley system further comprises a plurality of pulleys around which the belt wraps. In some embodiments, the motors are configured to drive the belt of the pulley system to maneuver the target arm in a coordinated and controlled manner.

In some embodiments, the target arm comprises the pivot arm, the target head, and the target. In some embodiments, the pivot bracket is attached to the drivetrain assembly. In some embodiments, the quick-release pin secures a proximal end of the target arm to the pivot bracket attached to the drivetrain assembly. In some embodiments, the target arm is configured to be re-positioned with respect to the pivot bracket to expose the target outside of the cover. In some embodiments, outside the cover includes exposure of the target to the left, right, or top of the cover.

In some embodiments, the target head is attached to a distal end of the target arm. In some embodiments, the target head comprises a tube and a ring. In some embodiments, the target head tube is configured to slide over the distal end of the target arm. In some embodiments, the target head tube is secured to the target arm by one or more fasteners. In some embodiments, the target head ring allows for various types of targets to be attached.

In some embodiments, the cover comprises a fabric cover that provides protection to operational components of the apparatus. In some embodiments, the fabric cover comprises a two-piece fabric assembly that limits exposure to exterior and ambient elements during usage. In some embodiments, the fabric cover is bullet proof and provides an insulated, heat reflective shell. Furthermore, the cover is designed in such a way that it allows for a full range of movement without interfering with the internal mechanism.

In some embodiments, the controller comprises the electronics enclosure, the plurality of control buttons, and the circuit panel. In some embodiments, the electronics enclosure is mounted to the frame and the circuit panel is encapsulated within the electronics enclosure. In some embodiments, the control buttons are externally exposed along an exterior surface of the electronics enclosure and connect to the circuit panel through the electronics enclosure. In some embodiments, the circuit panel comprises an electronic system with a printed circuit board, a processing unit configured to execute control instructions to control movement of the apparatus during operation, and a wireless communication circuit that is configured to receive wireless control signals. In some embodiments, the wireless communication circuit comprises a WiFi module configured to receive WiFi control signals. In some embodiments, the wireless communication circuit comprises a Bluetooth module configured to receive Bluetooth control signals.

In some embodiments, the power source comprises the rechargeable battery and the battery pack dock. In some embodiments, the battery pack dock is mounted to the frame and the rechargeable battery is encapsulated within the battery pack dock. In some embodiments, the circuit panel of the controller and the motors are powered by the rechargeable battery.

Other features and advantages of aspects of the present invention will become apparent from the following more detailed description, taken in conjunction with the accompanying drawings, which illustrate, by way of example, the principles of aspects of the invention.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Embodiments of the automated moving target apparatus described in this specification include a high-performance automated moving target that is configured to mimic unpredictable human motion for applications in real-life scenarios. Specifically, the apparatus of some embodiments is a self-propelled, electric target positioning device that is capable of rapid and precise movements in two axes to maneuver a target for the purpose of enhancing the training involved in various applications in real-life scenarios. Examples of applications in real-life scenarios include, without limitation, training in military/law enforcement, participating in target-based gaming, such as paint ball, and other shooting sports.

In some embodiments, the apparatus comprises a frame, a drivetrain assembly, a target arm, a cover, and a controller. In some embodiments, the apparatus is powered by a power source. In some embodiments, the apparatus further comprises a target head, a target, a pivot arm, a pivot bracket, a quick-release pin, a pulley system, a plurality of fasteners, an electronics enclosure, a plurality of control buttons, a circuit panel, a battery pack dock, and a battery. In some embodiments, the battery comprises a rechargeable battery. In some embodiments, the battery comprises a rechargeable battery. In some embodiments, the target comprises a two-dimensional (2D) target. In some embodiments, the target comprises a three-dimensional (3D) target.

In some embodiments, the frame is a lightweight superstructure that provides mounting features for all components of the apparatus, as well as mounting features for securing the device when deployed in the field.

In some embodiments, the drivetrain assembly comprises a two-axis, quad-rail system comprising a lateral drivetrain bar and a vertical drivetrain bar. In some embodiments, the drivetrain assembly comprises at least one electric motor, a pulley system, and a belt of the pulley system. In some embodiments, the drivetrain assembly attaches to the frame and the electric motor is configured to drive the belt of the pulley system to vertically move the lateral drivetrain bar and laterally move the vertical drivetrain bar. In some embodiments, the drivetrain assembly comprises two electric motors attached to opposing ends of the lateral drivetrain bar. In some embodiments, the pulley system further comprises a plurality of pulleys around which the belt wraps. In some embodiments, the motors are configured to drive the belt of the pulley system to maneuver the target arm in a coordinated and controlled manner.

In some embodiments, the target arm comprises the pivot arm, the target head, and the target. In some embodiments, the pivot bracket is attached to the drivetrain assembly. In some embodiments, the quick-release pin secures a proximal end of the target arm to the pivot bracket attached to the drivetrain assembly. In some embodiments, the target arm is configured to be re-positioned with respect to the pivot bracket to expose the target outside of the cover. In some embodiments, outside the cover includes exposure of the target to the left, right, or top of the cover.

In some embodiments, the target head is attached to a distal end of the target arm. In some embodiments, the target head comprises a tube and a ring. In some embodiments, the target head tube is configured to slide over the distal end of the target arm. In some embodiments, the target head tube is secured to the target arm by one or more fasteners. In some embodiments, the target head ring allows for various types of targets—including 2D targets and 3D targets—to be attached.

In some embodiments, the cover comprises a fabric cover. In some embodiments, the fabric cover comprises a two-piece fabric assembly that limits exposure to exterior and ambient elements during usage. In some embodiments, the plurality of fasteners fasten the fabric cover to the frame. In some embodiments, the plurality of fasteners comprises a plurality of grommet fasteners. In some embodiments, the fabric cover is bullet proof and provides an insulated, heat reflective shell. In this way, the cover provides some protection for many of the operational components of the apparatus. Furthermore, the cover is designed in such a way that it allows for a full range of movement without interfering with the internal mechanism.

In some embodiments, the controller comprises the electronics enclosure, the plurality of control buttons, and the circuit panel. In some embodiments, the electronics enclosure is mounted to the frame and the circuit panel is encapsulated within the electronics enclosure. In some embodiments, the control buttons are externally exposed along an exterior surface of the electronics enclosure and connect to the circuit panel through the electronics enclosure. In some embodiments, the circuit panel comprises an electronic system with a printed circuit board, a processing unit configured to execute control instructions to control movement of the apparatus during operation, and a wireless communication circuit that is configured to receive wireless control signals. In some embodiments, the wireless communication circuit comprises a WiFi module configured to receive WiFi control signals. In some embodiments, the wireless communication circuit comprises a Bluetooth module configured to receive Bluetooth control signals. An example of an electronic system is described below, by reference to FIG. 7.

In some embodiments, the power source comprises the battery and the battery pack dock. In some embodiments, the power source further comprises an outlet power port connection disposed along the battery pack dock. In some embodiments, the battery comprises a rechargeable battery that is rechargeable via the outlet power port connection. In some embodiments, the battery pack dock is mounted to the frame and the rechargeable battery is encapsulated within the battery pack dock. In some embodiments, the circuit panel of the controller and the motors are powered by the rechargeable battery.

As stated above, live scenario training for projectile weapons, weapon toys, etc., for individuals without a practice partner is a challenge with the existing options in the market because they are typically statically placed at various positions and do not move in any realistic manner, rending them ineffective. Unfortunately, accuracy is lacking in users due to several factors including, without limitation, lack of muscle memory and lack of speed (slow reaction time). Furthermore, there is no target in the market that mimics human movement both horizontally and vertically in either consistent or random (unpredictable) patterns. Embodiments of the apparatus described in this specification solve such problems by providing an automated target that mimics human motion for target practice, and which is both random and repetitive.

The apparatus of the present disclosure generally works by electrical power, battery (e.g., rechargeable battery), with a circuit panel, a printed circuit board (PCB) with a processing unit and/or a control module that automates the drivetrain by motors to go back and forth (laterally) and up and down (vertically) at a nearly random, unpredictable manner, and/or in consistent, timed movement. In this way, the apparatus is automated (self-propelled) and is mechanical in nature (driven my belts of a pulley system included in the drivetrain assembly) to move on its own when turned on, either by control buttons of the controller or by remote control via wireless signal. The apparatus can be made to mimic a human taking cover behind something and popping its head out from behind cover, an animal scurrying for cover and checking for danger, or any other quickly and/or sporadically moving target.

To make the apparatus of the present disclosure, a person would configure the target to extend outward along an angular arc of 180 degrees, and to vertically up and down and/or move laterally back and forth in motion that simulates the random, unpredictable movements of a person or other active target appearing from a hidden covered position or otherwise being active in an individual's training field. The motors of the apparatus further allow functionality that creates highly similar random patterns that one might anticipate from a fleeing target or target under pressure. In combination with the controller, the motors cause the motion in seemingly random, but also in known programmatic patterns, by way of up and down (vertical) and back and forth (lateral) motion. In particular, the controller is able to track several aspects of target exposure in real-time to effectuate random motion. Among the several aspects of target exposure detected by the controller in real-time are, without limitation, frequency of target exposure, target exposure time, and consistency of target exposure height.

To use the apparatus of the present disclosure, a person would either start the system running (by select a control button along the controller to power up) and then engage in target practice where the target will be automated to in seemingly random ways (up and down vertically and laterally back and forth) and at varied speeds (which further randomized the motion). In training scenarios, the apparatus behaves like a human or other moving target with seemingly arbitrary movements in any direction. In this way, the apparatus can help law enforcement, military, and recreational shooters practice in the element of surprise. The apparatus can also be configured with settings to replicate a more predictable manner of movement so that a user can engage in target practice for repetitive, timed target movements to train muscle memory and reaction/tracking. This will allow the user to develop better muscle memory and allow them to perform more randomized target practice.

Embodiments of the apparatus described in this specification differ from and improve upon currently existing target options. In particular, some embodiments of the apparatus differ from currently existing targets, which do not move in multiple directions-either randomly or consistently. By contrast, the apparatus is able to mimic human motion in multiple directions, and do so randomly and/or consistently. As such, the apparatus provides a target to train for real life scenarios because it is configured to mimic human motion along two axis of movement, at various speeds, thereby improving reaction time, accuracy, and building muscle memory.

In addition, the existing targets in the market cannot be picked up and moved easily at will. By contrast, the apparatus described in this disclosure is easy to move via wheel/casters and the target itself can easily be repositioned by way of a pivot bracket that confers at least 180 degrees of repositioning placement for the target arm and target.

Figure 1:
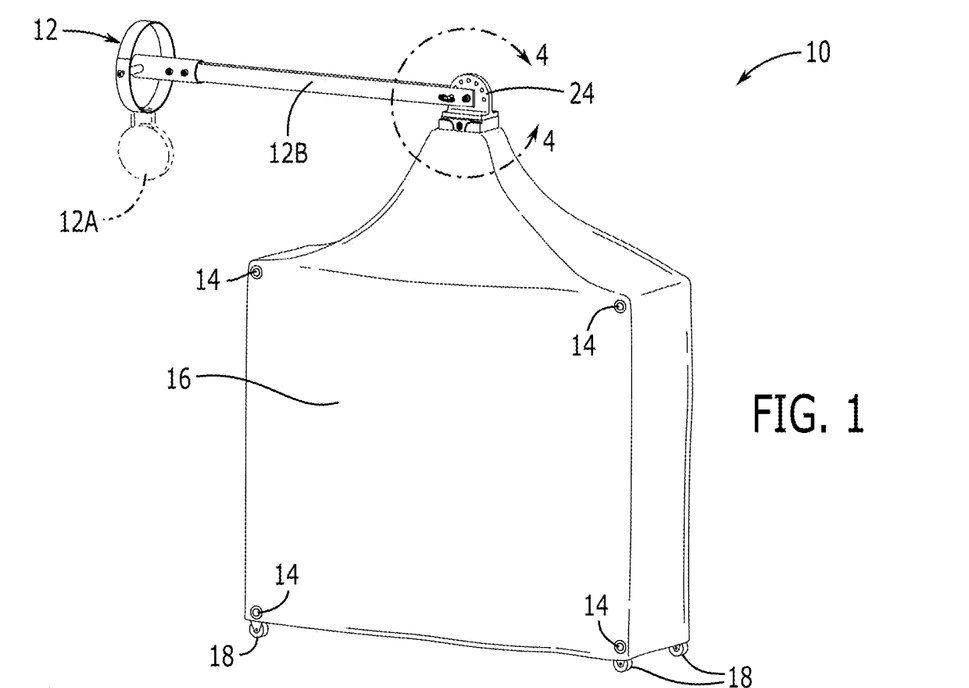
FIG. 1 is a perspective view of an exemplary automated moving target apparatus, in accordance with at least one embodiment.

By way of example, FIG. 1 conceptually illustrates a perspective view of an exemplary automated moving target apparatus 10, in accordance with at least one embodiment. As shown in this figure, the apparatus 10 includes a target head 12, an exemplary target 12A, pivot arm 12B, a plurality of fasteners 14, a cover 16, a plurality of casters 18, and a pivot bracket 24. The components of the apparatus 10 are assembled together such that the pivot arm 12B extends out of a frame 12C of the apparatus 10. The frame 12C of the apparatus 10 is described below, by reference to FIG. 2. In at least one embodiment, the cover 16 is constructed out of fabric and attaches to the frame 12C by several fasteners 14. The cover 16, when attached to the frame 12C, provides shielding for other operational components of the apparatus 10. In some embodiments, the cover 16 is bullet proof. In this way, bullets and projectiles are blocked from making direct impact to the internal operational components of the apparatus 10. In some embodiments, the cover 16 provides an insulated, heat reflective shell to protect the internal operational components of the apparatus 10 from heat damage.

Figure 2:
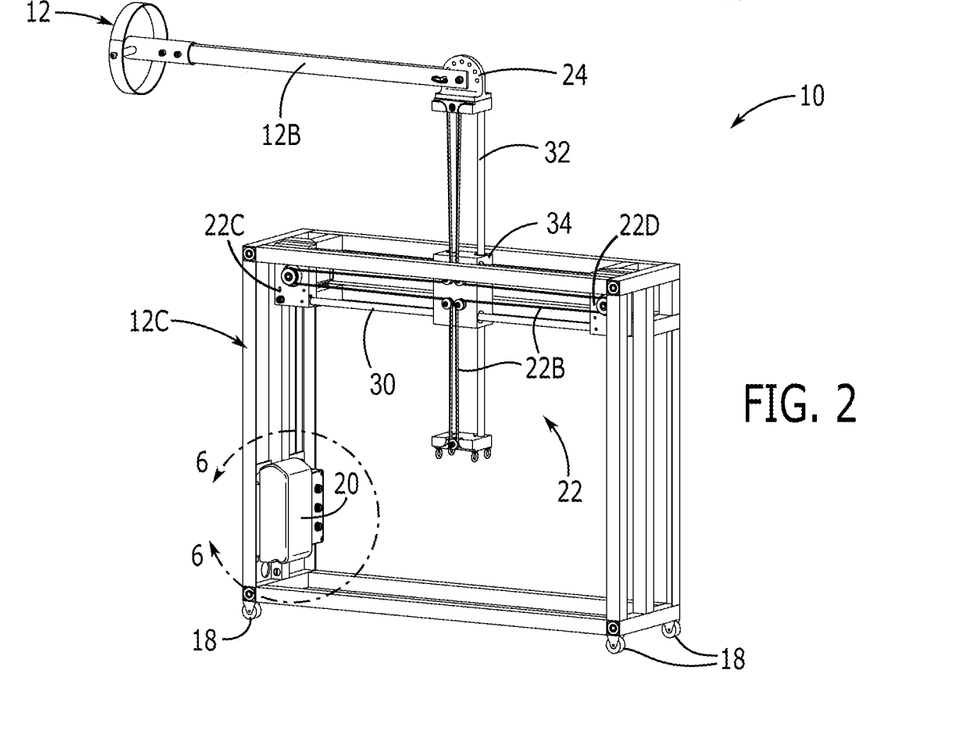
FIG. 2 is a perspective view of an exemplary frame of the apparatus, in accordance with at least one embodiment.
Figure 4:
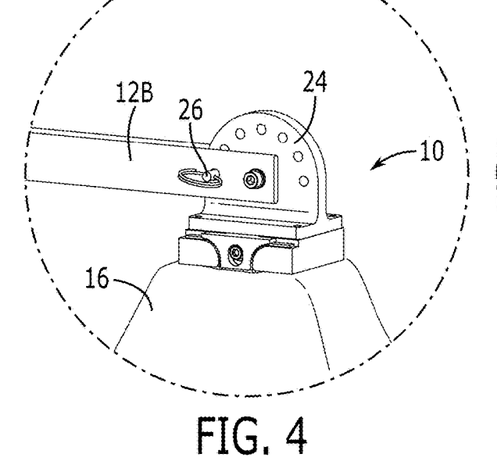
FIG. 4 is a detailed perspective view taken along line 4-4 of FIG. 1, showing a first position of an exemplary pivot arm of the apparatus, in accordance with at least one embodiment.

While the cover 16 protects several internal operational components of the apparatus 10, other components are configured to be exposed externally. In particular, the target 12A of the apparatus 10 is intended to be exposed for an individual to train. As shown in FIGS. 1 and 2, the target 12A is exposed through several interconnected components. Specifically, in at least one embodiment, the exemplary target 12A is attached to the target head 12. The target head 12 attaches to the distal end of the pivot arm 12B. The proximal end of the pivot arm 12B attaches to the pivot bracket 24. The pivot bracket 24 confers a range semi-circular repositioning of the pivot arm 12B. The range of semi-circular repositioning shown in this figure is 180 degrees of repositioning of the pivot arm 12B. Repositioning of the pivot arm 12B is described in further detail below, by reference to FIGS. 4 and 5.

By way of another view, FIG. 2 conceptually illustrates a further perspective view of the apparatus 10 with the cover 16 removed. As shown in this figure, the apparatus 10 includes the target head 12, the pivot arm 12B, the casters 18, and the pivot bracket 24. However, the fasteners 14 and the cover 16 are omitted, which reveals additional components of the apparatus 10, namely, a frame 12C, a battery pack dock 20, a drivetrain assembly 22, and a belt 22B. The casters 18 and the battery pack dock 20 are mounted to the frame 12C, while the drivetrain assembly 22 is attached to opposing sides of the frame 12C—one side being a side of the frame 12C to which the battery pack dock 20 is mounted and the other side being the opposite side of the frame 12C of the former (side with battery pack dock 20). Additionally, the pivot bracket 24 is attached to part of the drivetrain assembly 22 that is configured to extend out from the frame 12C and is exposed above the cover 16 when the cover 16 is used. The battery pack dock 20 includes a battery to power the belt 22B of the drivetrain assembly 22, thereby allowing the drivetrain assembly 22 to move the target head 12 along two axes, which is described in greater detail by reference to FIG. 3. Also, the battery pack dock 20 and other components of the apparatus 10 that are involved in the operation of moving the drivetrain assembly 22 are described further below, by reference to FIG. 6. Specifically, a battery in the battery pack dock 20 powers a controller. The battery pack dock 20 itself attaches to the frame 12C via brackets. The casters 18 are mounted to the bottom of the frame 12C to provide mobility of the apparatus 10. With its relatively compact size, manageable weight, and casters 18, the apparatus 10 can be utilized virtually anywhere—e.g., placed in an outside environment, indoor environment, or almost anywhere else.

Figure 3:
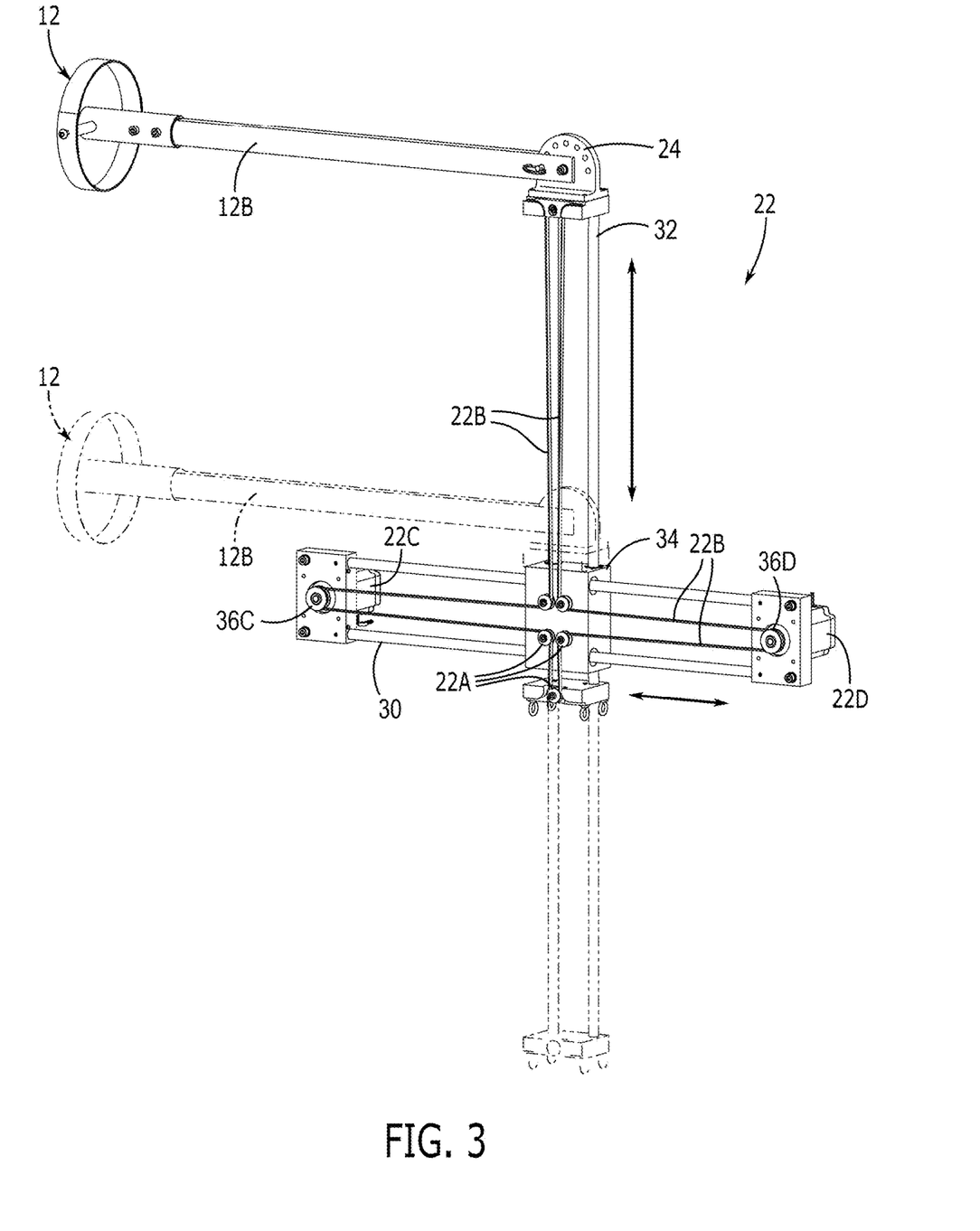
FIG. 3 is a perspective view of an exemplary drivetrain assembly of the apparatus, in accordance with at least one embodiment.

By way of example, FIG. 3 conceptually illustrates a perspective view of an exemplary drivetrain assembly 22 of the apparatus 10, in accordance with at least one embodiment. As shown in this figure, the drivetrain assembly 22 includes a plurality of pulleys 22A, a belt 22B, a first motor 22C and a second motor 22D. Furthermore, the pivot arm 12B is shown in this figure as being attached to the drivetrain assembly 22. In at least one embodiment, the drivetrain assembly 22 provides a lateral drivetrain bar 30 and a vertical drivetrain bar 32, with the first motor 22C mounted to the frame 12C in a position proximal to a right side of the frame 12C and the second motor 22D mounted to the frame 12C in a position proximal to a laterally opposing left side of the frame 12C. In at least one embodiment, the lateral drivetrain bar 30 is substantially horizontally oriented and extends between the first motor 22C and the second motor 22D. A carrier 34 is slidably engaged with the lateral drivetrain bar 30 and configured for slidably traversing along the lateral drivetrain bar 30 between the first motor 22C and the second motor 22D. In at least one embodiment, the vertical drivetrain bar 32 is substantially vertically oriented and slidably engaged with the carrier 34, such that the vertical drivetrain bar 32 is oriented substantially transverse to the lateral drivetrain bar 30. Additionally, the vertical drivetrain bar 32 is configured for slidably traversing relative to the carrier 34 in a substantially vertical (i.e., up and down) direction. In at least one embodiment, the pivot arm 12B is engaged with an upper end of the vertical drivetrain bar 32. Accordingly, in at least one embodiment, from the perspective of a Cartesian coordinate system conceptually overlaying a front view of the frame 12C, the pivot arm 12B (and, in turn, the target 12A) is capable of selectively moving along each of the X-axis (lateral) and Y-axis (vertical) relative to the frame 12C.

In at least one embodiment, the first motor 22C provides a first motor wheel 36C, and the second motor 22D provides a second motor wheel 36D, with each of the first and second motor wheels 36C and 36D capable of rotating in both a first direction (i.e., clockwise or counterclockwise) and an opposing second direction (i.e., if the first direction is clockwise, the opposing second direction would be counterclockwise, and vice versa). Additionally, in at least one embodiment, each of the upper end and an opposing lower end of the vertical drivetrain bar 32 provides an at least one pulley 22A. Similarly, in at least one embodiment, the carrier 34 provides at least four pulleys 22A, such that each of the pulleys 22A on the vertical drivetrain bar 32 and carrier 34 are in substantially the same vertically oriented plane as the first motor wheel 36C and second motor wheel 36D. In at least one embodiment, a continuous belt 22B is engaged about each of the pulleys 22A on the vertical drivetrain bar 32 and carrier 34, as well as the first motor wheel and second motor wheel 36C and 36D, in series. Accordingly, in such embodiments, the first motor 22C and second motor 22D are capable of cooperating, via the belt 22B, to selectively move the pivot arm 12B (and, in turn, the target 12A) along each of the X-axis (lateral) and Y-axis (vertical) relative to the frame 12C.

In a bit more detail, in at least one such embodiment, the first and second motors 22C and 22D are capable of moving the target 12A along the X-axis toward the left side of the frame 12C by the first and second motors 22C and 22D rotating the respective first and second motor wheels 36C and 36D in the first direction at an equal rotational speed. Similarly, in at least one embodiment, the first and second motors 22C and 22D are capable of moving the target 12A along the X-axis toward the right side of the frame 12C by the first and second motors 22C and 22D rotating the respective first and second motor wheels 36C and 36D in the opposing second direction at an equal rotational speed. In at least one embodiment, the first and second motors 22C and 22D are capable of moving the target 12A along the Y-axis toward a top edge of the frame 12C by the first motor 22C rotating the first motor wheel 36C in the first direction, and the second motor 22D rotating the second motor wheel 36D in the second direction at an equal rotational speed. Similarly, in at least one embodiment, the first and second motors 22C and 22D are capable of moving the target 12A along the Y-axis toward an opposing bottom edge of the frame 12C by the first motor 22C rotating the first motor wheel 36C in the second direction, and the second motor 22D rotating the second motor wheel 36D in the first direction at an equal rotational speed. In at least one embodiment, the first and second motors 22C and 22D are capable of moving the target 12A along each of the X-axis and Y-axis by rotating the respective first and second motor wheels 36C and 36D in different rotational directions and/or at different rotational speeds.

For example, in at least one embodiment, the first and second motors 22C and 22D are capable of moving the target 12A at a roughly 45-degree angle toward an upper left corner of the frame 12C by the first motor 22C preventing the first motor wheel 36C from rotating, and the second motor 22D rotating the second motor wheel 36D in the second direction. Similarly, in at least one embodiment, the first and second motors 22C and 22D are capable of moving the target 12A at a roughly 45-degree angle toward an upper right corner of the frame 12C by the first motor 22C rotating the first motor wheel 36C in the first direction, and the second motor 22D preventing the second motor wheel 36D from rotating. In at least one embodiment, the first and second motors 22C and 22D are capable of moving the target 12A at a roughly 45-degree angle toward a lower right corner of the frame 12C by the first motor 22C preventing the first motor wheel 36C from rotating, and the second motor 22D rotating the second motor wheel 36D in the first direction. Similarly, in at least one embodiment, the first and second motors 22C and 22D are capable of moving the target 12A at a roughly 45-degree angle toward a lower left corner of the frame 12C by the first motor 22C rotating the first motor wheel 36C in the second direction, and the second motor 22D preventing the second motor wheel 36D from rotating. As yet another example, the first and second motors 22C and 22D are capable of moving the target 12A at a roughly 10-degree off-vertical angle toward an upper left corner of the frame 12C by the first motor 22C rotating the first motor wheel 36C in the first direction, and the second motor 22D rotating the second motor wheel 36D in the second direction at a rotational speed that is slightly faster than the rotational speed of the first motor wheel 36C.

Thus, in such embodiments, given that the first and second motors 22C and 22D are mounted to the frame 12C, the apparatus 10 benefits from the reduced inertial load inherent with gantry systems that must move one or both of the motors that drive movement along the X-axis and/or Y-axis. In traditional gantry systems, one motor drives movement along the X-axis while another motor drives movement along the Y-axis. This is not the case with the apparatus 10, as movement along both the X-axis and Y-axis is achieved with both the first and second motors 22C and 22D via the single belt 22B, as described above. Thus, the positional output of the target 12A is dependent on the rotational direction and rotational speed of each of the first and second motors 22C and 22D relative to one other. Furthermore, with such an arrangement of components, there is minimal mass needed to lift/move the target 12A along the Y-axis as it is the one that is being affected most by gravity.

In some embodiments, the apparatus 10 is further configured to provide movement along a third axis (referred to herein as the alpha axis). Specifically, in at least one embodiment, the apparatus 10 includes a swivel plate between the pivot bracket 24 and the point of attachment to the drivetrain assembly 22. In some embodiments, the swivel plate is configured to circularly rotate 360 degrees. With the pivot arm 12B attached to the pivot bracket 24 and the target head 12 attached to the pivot arm 12B, the apparatus 10 is able to render movements along the alpha axis to swivel around in a way that extends the target 12A outward (toward the user) and further swivel to extend the target 12A backward (away from the user). In this way, the apparatus 10 provides arbitrary movements of the target 12A above the frame 12C and other (covered) components in a semi-circular dome with a radius of approximately the length of the pivot arm 12 with target head 12 attached.

Figure 5:
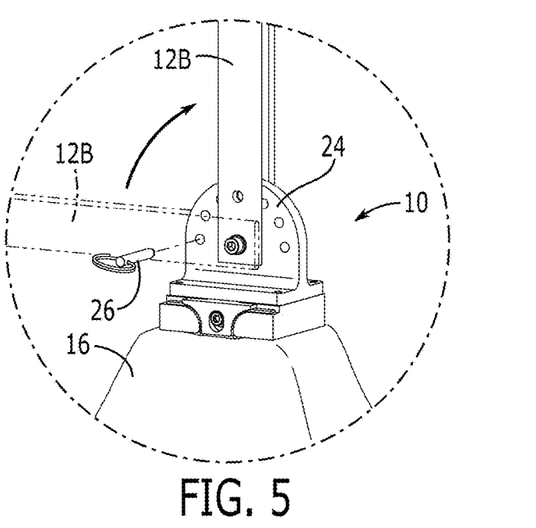
FIG. 5 is a further detailed perspective view taken along line 4-4 of FIG. 1, showing a second position of the exemplary pivot arm of the apparatus, in accordance with at least one embodiment.

As noted above, the pivot bracket 24 confers a range semi-circular repositioning of up to 180 degrees of repositioning of the pivot arm 12B. Repositioning of the pivot arm 12B is described next, by reference to FIGS. 4 and 5. Specifically, FIG. 4 conceptually illustrates a detailed perspective view, taken along line 4-4 of FIG. 1, showing a first position of an exemplary the pivot arm 12B of the apparatus 10. As shown in this figure, a quick-release pin 26 secures the proximal end of the pivot arm 12 to the pivot bracket 24, which is attached to the drivetrain assembly 22 above the cover 16. In this first position, the target head 12 would be positioned outward to the left and just above the cover 16 (a lowest height allowed for the target 12A). Turning to FIG. 5, another detail perspective view is conceptually illustrated that is similar to that shown in FIG. 4, but in this case, showing the quick-release pin 26 removed and a repositioning of the pivot arm 24 to a second position that is oriented vertically. In this manner, the target head 12 would appear at its highest possible (when, for example, the drivetrain assembly 22 is motorized to extend vertically to its peak height).

In at least one further embodiment, angular movement of the pivot arm 12B relative to the pivot bracket 24 may be achieved automatically via an at least one alpha axis motor. In at least one such embodiment, a smaller stepper motor is mounted to the upper end of the vertical drivetrain bar 32. On its spindle is a plate that holds an arm that the target 12A can be placed on. The alpha axis motor is driven by the same controller as the first and second motors 22C and 22D and can be coordinated in their motions. This can be used in conjunction with other target mounting options to add a degree of complexity for training.

Figure 6:
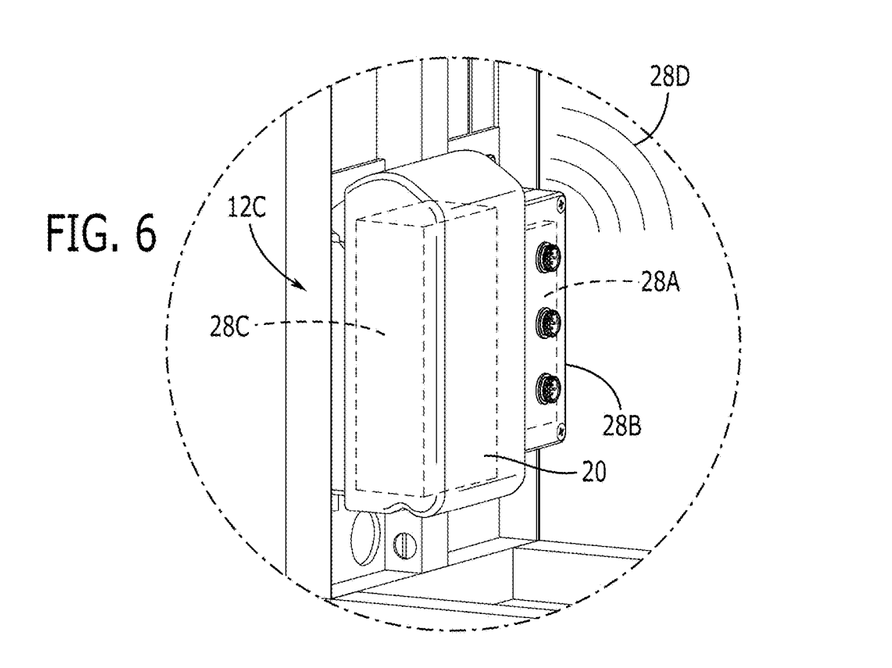
FIG. 6 is a detailed perspective view taken along line 6-6 of FIG. 2, in accordance with at least one embodiment.

Now, turning to another example, FIG. 6 conceptually illustrates a detail perspective view of the battery pack dock 20, taken along line 6-6 of FIG. 2, of the apparatus 10. As shown in this figure, the battery pack dock 20 is mounted to the frame 12C and a rechargeable battery 28C is installed in the battery pack dock 20. Furthermore, an electronics enclosure 28B is disposed alongside the battery pack dock 20 and is mounted to the frame 12C. In some embodiments, wiring between the battery pack dock 20 and the electronics enclosure 28B enable power from the rechargeable battery 28C to flow to the controller. In particular, the electronics enclosure 28B shown in this figure includes a circuit panel 28A and a plurality of control buttons. The control buttons trigger operational modules of the circuit panel 28A to enable manual operation of the apparatus 10. However, the circuit panel 28A also includes a wireless communication circuit that is configured to send and receive wireless control signals, such as the WiFi control signal 28D shown in this figure. While not being limited to WiFi, the wireless communication circuit may also (or separately) include a Bluetooth module configured to receive wireless Bluetooth control signals. In some embodiments, the wireless communication circuit includes both WiFi and Bluetooth modules, which make the controller capable of multiple wireless communication standards including at least WiFi and Bluetooth communications. In this way, the apparatus 10 is configured to be externally controllable via mobile device, laptop, remote control device, or other web page capable devices.

In at least one further embodiment, the apparatus 10 further includes a plurality of piezo contact microphones that are in mechanical communication with the target 12A. In at least one such embodiment, each piezo contact microphones reads the "noise" that is generated by the motions of the target 12A. An on-board microprocessor analyzes those sound signals to determine when the target 12A has been hit by a bullet. On a hit, the microprocessor would communicate back to the home system which target 12A was hit and at what time, such that the apparatus 10 is then able to use that data for more complex motion profiles; ones that could react to the target 12A being hit.

In at least one still further embodiment, the apparatus 10 further includes an at least one motion sensor configured for detecting moving steel or bodies of water (including humans), and through complex analysis of the returning wave function, enables the apparatus 10 to determine things like presence, a person's distance from the sensor, whether they are moving or staying still, etc. This can allow the apparatus 10 to perform a number of different tasks with the sensor as it will communicate back with the controller.

In at least one still further embodiment, the apparatus 10 is configured for voice processing, which allows the apparatus 10 to enhance multiple types of training scenarios, but particularly law enforcement. Specifically, a law enforcement officer (as a user of the apparatus 10) could give commands to the target 12A in the same way they might give commands to a suspect. The apparatus 10 could analyze the speech via an AI speech processor, speak back, or move the target 12A in a way that mimics the scenario being trained. On the simpler end, the voice activation of target 12a motions allows for changing training motions without the user needing to put down their firearm.

In this specification, the terms "program", "instructions", and "software" are meant to include software applications or control programs (referred to simply as "software") stored in magnetic storage, which can be read into memory for processing by a processor. In some embodiments, the software, when installed to operate on one or more electronic systems, define one or more specific machine implementations that execute and perform the operations of the software in connection with the apparatus. In particular, the operational functions of the apparatus described above may be implemented as software processes that are specified as a set of instructions recorded on a computer readable storage medium (also referred to as a non-transitory computer readable medium). When these instructions are executed by one or more processing unit(s), they cause the processing unit(s) to perform the actions indicated in the instructions. Examples of computer readable media include, but are not limited to, CD-ROMs, flash drives, RAM chips, hard drives, EPROMs, EEPROMs, etc. The computer readable media does not include carrier waves and electronic signals passing wirelessly or over wired connections.

Figure 7:
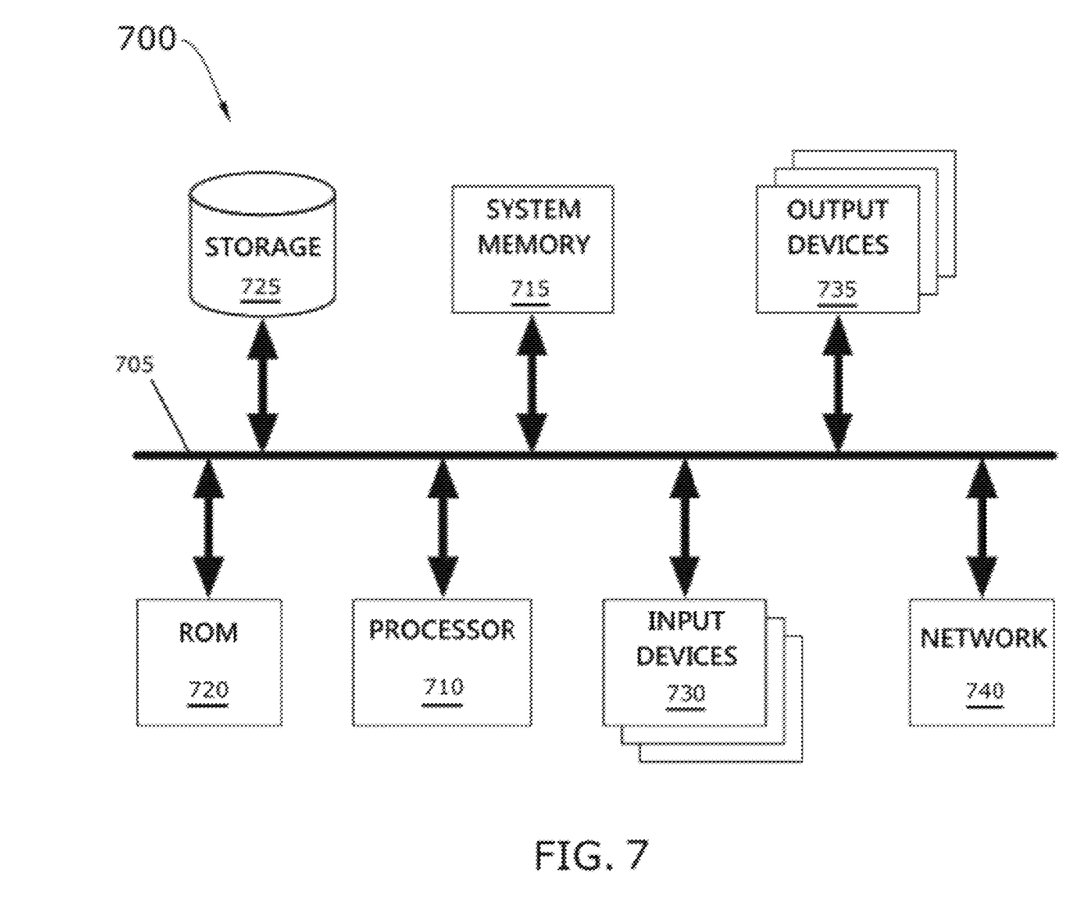
FIG. 7 is a conceptual illustration of an exemplary electronic system with which some embodiments of the apparatus are implemented, in accordance with at least one embodiment.

By way of example, FIG. 7 illustrates an exemplary electronic system 700 with which some embodiments of the apparatus are implemented. The electronic system 700 may be any controller circuit, printed circuit board (PCB) computing device, single board computer (SBC), or any other sort of electronic systems that is configured to carry out software instructions for operational control of the apparatus. Such an electronic system includes various types of computer readable media and interfaces for various other types of computer readable media and may be configured to communicate via wireless communication protocols (such as, without limitation, WiFi and Bluetooth) to external user devices, such as smartphones, tablet computing devices, personal computers (PCs) such as laptops and desktop computers, and other user computing devices. Electronic system 700 includes a bus 705, processing unit(s) 710, a system memory 715, a read-only memory 720, a permanent storage device 725, input devices 730, output devices 735, and a network 740.

Aspects of the present specification may also be described as the following embodiments:

1. An automated moving target apparatus comprising: a frame; a drivetrain assembly engaged with the frame, the drivetrain assembly comprising: a first motor mounted to the frame in a position proximal to a right side of the frame, the first motor providing a first motor wheel capable of selectively rotating in each of a first rotational direction and an opposing second rotational direction; a second motor mounted to the frame in a position proximal to a laterally opposing left side of the frame, the second motor providing a second motor wheel capable of selectively rotating in each of the first and second rotational directions; a substantially horizontally oriented lateral drivetrain bar extending between the first motor and the second motor; a carrier slidably engaged with the lateral drivetrain bar and configured for slidably traversing along the lateral drivetrain bar between the first motor and the second motor; a substantially vertically oriented vertical drivetrain bar slidably engaged with the carrier, such that the vertical drivetrain bar is oriented substantially transverse to the lateral drivetrain bar and configured for slidably traversing relative to the carrier in a substantially vertical direction; each of an upper end and an opposing lower end of the vertical drivetrain bar providing an at least one pulley, and the carrier providing at least four pulleys, said pulleys being positioned in a vertically oriented plane in which the first motor wheel and second motor wheel are also positioned; and a continuous belt engaged about each of the pulleys along with the first motor wheel and second motor wheel in series; and a pivot arm engaged with the upper end of the vertical drivetrain bar, the pivot arm providing an at least one target engaged therewith; whereby, the first motor and second motor are capable of cooperating, via the belt, to selectively move the pivot arm—and, in turn, the at least one target—along each of a substantially horizontally oriented X-axis and a substantially vertically oriented Y-axis relative to the frame by rotating the respective first and second motor wheels.

2. The automated moving target apparatus according to embodiment 1, wherein: the first and second motors are capable of moving the at least one target along the X-axis toward the left side of the frame by the first and second motors rotating the respective first and second motor wheels in the first rotational direction at an equal rotational speed; and the first and second motors are capable of moving the at least one target along the X-axis toward the right side of the frame by the first and second motors rotating the respective first and second motor wheels in the second rotational direction at an equal rotational speed.

3. The automated moving target apparatus according to embodiments 1-2, wherein: the first and second motors are capable of moving the at least one target along the Y-axis toward a top edge of the frame by the first motor rotating the first motor wheel in the first rotational direction, and the second motor rotating the second motor wheel in the second rotational direction at an equal rotational speed; and the first and second motors are capable of moving the at least one target along the Y-axis toward an opposing bottom edge of the frame by the first motor rotating the first motor wheel in the second rotational direction, and the second motor rotating the second motor wheel in the first rotational direction at an equal rotational speed.

4. The automated moving target apparatus according to embodiments 1-3, wherein: the first and second motors are capable of moving the at least one target at a roughly 45-degree angle toward an upper left corner of the frame by the first motor preventing the first motor wheel from rotating, and the second motor rotating the second motor wheel in the second rotational direction; and the first and second motors are capable of moving the at least one target at a roughly 45-degree angle toward an upper right corner of the frame by the first motor rotating the first motor wheel in the first rotational direction, and the second motor preventing the second motor wheel from rotating.

5. The automated moving target apparatus according to embodiments 1-4, wherein: the first and second motors are capable of moving the at least one target at a roughly 45-degree angle toward a lower right corner of the frame by the first motor preventing the first motor wheel from rotating, and the second motor rotating the second motor wheel in the first rotational direction; and the first and second motors are capable of moving the at least one target at a roughly 45-degree angle toward a lower left corner of the frame by the first motor rotating the first motor wheel in the second rotational direction, and the second motor preventing the second motor wheel from rotating.

6. The automated moving target apparatus according to embodiments 1-5, wherein the pivot arm is pivotally engaged with the upper end of the vertical drivetrain bar.

7. The automated moving target apparatus according to embodiments 1-6, wherein: the at least one target is engaged with a distal end of the pivot arm; and an opposing proximal end of the pivot arm is pivotally engaged with a pivot bracket provided by the upper end of the vertical drivetrain bar.

8. The automated moving target apparatus according to embodiments 1-7, wherein the pivot bracket is configured for allowing the position of the pivot arm—and, in turn, the at least one target—to be angularly adjusted between 0 and 180 degrees relative to the upper end of the vertical drivetrain bar.

9. The automated moving target apparatus according to embodiments 1-8, wherein the pivot bracket provides a quick-release pin configured for selectively locking the angular position of the pivot arm relative to the upper end of the vertical drivetrain bar.

10. The automated moving target apparatus according to embodiments 1-9, further comprising a cover sized and configured for wrapping around and engaging the frame.

11. The automated moving target apparatus according to embodiments 1-10, wherein the cover is constructed out of a bulletproof material.

12. The automated moving target apparatus according to embodiments 1-11, wherein the cover comprises an insulated, heat reflective shell.

13. The automated moving target apparatus according to embodiments 1-12, further comprising a controller comprising an electronics enclosure and a circuit panel that is powered by a power source and configured to control rapid and precise movements of the at least one target along each of the X-axis and Y-axis via the first motor and second motor.

14. The automated moving target apparatus according to embodiments 1-13, wherein the controller is further configured to randomize the rapid and precise movements of the of the at least one target along each of the X-axis and Y-axis via the first motor and second motor.

15. The automated moving target apparatus according to embodiments 1-14, wherein the controller further comprises a plurality of manual control buttons that are connected to the circuit panel and externally exposed along an exterior surface of the electronics enclosure.

16. The automated moving target apparatus according to embodiments 1-15, wherein the circuit panel comprises a printed circuit board, a wireless communication circuit that is configured to receive wireless control signals, and a processing unit configured to execute control instructions to control the rapid and precise movements of the at least one target along each of the X-axis and Y-axis via the first motor and second motor.

17. The automated moving target apparatus according to embodiments 1-16, further comprising a rechargeable battery and a battery pack dock that is mounted to the frame, wherein the rechargeable battery is encapsulated within the battery pack dock and is configured to provide electric power to the controller during use of the apparatus.

18. The automated moving target apparatus according to embodiments 1-17, wherein each of the first motor and second motor is an electric motor.

19. The automated moving target apparatus according to embodiments 1-18, wherein the frame provides a plurality of casters positioned and configured for allowing the apparatus to be more easily transported when not in use.

20. An automated moving target apparatus comprising: a frame; a drivetrain assembly engaged with the frame, the drivetrain assembly comprising: a first motor mounted to the frame in a position proximal to a right side of the frame, the first motor providing a first motor wheel capable of selectively rotating in each of a first rotational direction and an opposing second rotational direction; a second motor mounted to the frame in a position proximal to a laterally opposing left side of the frame, the second motor providing a second motor wheel capable of selectively rotating in each of the first and second rotational directions; a substantially horizontally oriented lateral drivetrain bar extending between the first motor and the second motor; a carrier slidably engaged with the lateral drivetrain bar and configured for slidably traversing along the lateral drivetrain bar between the first motor and the second motor; a substantially vertically oriented vertical drivetrain bar slidably engaged with the carrier, such that the vertical drivetrain bar is oriented substantially transverse to the lateral drivetrain bar and configured for slidably traversing relative to the carrier in a substantially vertical direction; each of an upper end and an opposing lower end of the vertical drivetrain bar providing an at least one pulley, and the carrier providing at least four pulleys, said pulleys being positioned in a vertically oriented plane in which the first motor wheel and second motor wheel are also positioned; and a continuous belt engaged about each of the pulleys along with the first motor wheel and second motor wheel in series; a pivot arm engaged with the upper end of the vertical drivetrain bar, the pivot arm providing an at least one target engaged therewith; and a cover sized and configured for wrapping around and engaging the frame; whereby, the first motor and second motor are capable of cooperating, via the belt, to selectively move the pivot arm—and, in turn, the at least one target—along each of a substantially horizontally oriented X-axis and a substantially vertically oriented Y-axis relative to the frame by rotating the respective first and second motor wheels.

21. An automated moving target apparatus comprising: a frame; a drivetrain assembly engaged with the frame, the drivetrain assembly comprising: a first motor mounted to the frame in a position proximal to a right side of the frame, the first motor providing a first motor wheel capable of selectively rotating in each of a first rotational direction and an opposing second rotational direction; a second motor mounted to the frame in a position proximal to a laterally opposing left side of the frame, the second motor providing a second motor wheel capable of selectively rotating in each of the first and second rotational directions; a substantially horizontally oriented lateral drivetrain bar extending between the first motor and the second motor; a carrier slidably engaged with the lateral drivetrain bar and configured for slidably traversing along the lateral drivetrain bar between the first motor and the second motor; a substantially vertically oriented vertical drivetrain bar slidably engaged with the carrier, such that the vertical drivetrain bar is oriented substantially transverse to the lateral drivetrain bar and configured for slidably traversing relative to the carrier in a substantially vertical direction; each of an upper end and an opposing lower end of the vertical drivetrain bar providing an at least one pulley, and the carrier providing at least four pulleys, said pulleys being positioned in a vertically oriented plane in which the first motor wheel and second motor wheel are also positioned; and a continuous belt engaged about each of the pulleys along with the first motor wheel and second motor wheel in series; a pivot arm pivotally engaged proximally with the upper end of the vertical drivetrain bar; and an at least one target engaged with a distal end of the pivot arm; whereby, the first motor and second motor are capable of cooperating, via the belt, to selectively move the pivot arm—and, in turn, the at least one target—along each of a substantially horizontally oriented X-axis and a substantially vertically oriented Y-axis relative to the frame by rotating the respective first and second motor wheels.

In closing, regarding the exemplary embodiments of the present invention as shown and described herein, it will be appreciated that an automated moving target apparatus is disclosed and configured for mimicking unpredictable human motion for applications in real-life scenarios. Because the principles of the invention may be practiced in a number of configurations beyond those shown and described, it is to be understood that the invention is not in any way limited by the exemplary embodiments, but is generally directed to an automated moving target apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that any logic code, programs, modules, processes, and/or methods disclosed herein, along with the order in which the respective elements of any such method are performed, are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment. Additionally, the various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The phrase "non-transitory," in addition to having its ordinary meaning, as used in this document means "enduring or long-lived." The phrase "non-transitory computer readable medium," in addition to having its ordinary meaning, includes any and all computer readable mediums, with the sole exception of a transitory, propagating signal. This includes, by way of example and not limitation, non-transitory computer-readable mediums such as register memory, processor cache and random-access memory ("RAM").

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An automated moving target apparatus comprising:
a frame;
a drivetrain assembly engaged with the frame, the drivetrain assembly comprising:
a first motor mounted to the frame in a position proximal to a right side of the frame, the first motor providing a first motor wheel capable of selectively rotating in each of a first rotational direction and an opposing second rotational direction;
a second motor mounted to the frame in a position proximal to a laterally opposing left side of the frame, the second motor providing a second motor wheel capable of selectively rotating in each of the first and second rotational directions;
a substantially horizontally oriented lateral drivetrain bar extending between the first motor and the second motor;
a carrier slidably engaged with the lateral drivetrain bar and configured for slidably traversing along the lateral drivetrain bar between the first motor and the second motor;

a substantially vertically oriented vertical drivetrain bar slidably engaged with the carrier, such that the vertical drivetrain bar is oriented substantially transverse to the lateral drivetrain bar and configured for slidably traversing relative to the carrier in a substantially vertical direction;

each of an upper end and an opposing lower end of the vertical drivetrain bar providing an at least one pulley, and the carrier providing at least four pulleys, said pulleys being positioned in a vertically oriented plane in which the first motor wheel and second motor wheel are also positioned; and a continuous belt engaged about each of the pulleys along with the first motor wheel and second motor wheel in series; and a pivot arm engaged with the upper end of the vertical drivetrain bar, the pivot arm providing an at least one target engaged therewith;

whereby, the first motor and second motor are capable of cooperating, via the belt, to selectively move the pivot arm—and, in turn, the at least one target—along each of a substantially horizontally oriented X-axis and a substantially vertically oriented Y-axis relative to the frame by rotating the respective first and second motor wheels.

2. The automated moving target apparatus of claim 1, wherein:

the first and second motors are capable of moving the at least one target along the X-axis toward the left side of the frame by the first and second motors rotating the respective first and second motor wheels in the first rotational direction at an equal rotational speed; and the first and second motors are capable of moving the at least one target along the X-axis toward the right side of the frame by the first and second motors rotating the respective first and second motor wheels in the second rotational direction at an equal rotational speed.

3. The automated moving target apparatus of claim 1, wherein:

the first and second motors are capable of moving the at least one target along the Y-axis toward a top edge of the frame by the first motor rotating the first motor wheel in the first rotational direction, and the second motor rotating the second motor wheel in the second rotational direction at an equal rotational speed; and the first and second motors are capable of moving the at least one target along the Y-axis toward an opposing bottom edge of the frame by the first motor rotating the first motor wheel in the second rotational direction, and the second motor rotating the second motor wheel in the first rotational direction at an equal rotational speed.

4. The automated moving target apparatus of claim 1, wherein:

the first and second motors are capable of moving the at least one target at a roughly 45-degree angle toward an upper left corner of the frame by the first motor preventing the first motor wheel from rotating, and the second motor rotating the second motor wheel in the second rotational direction; and the first and second motors are capable of moving the at least one target at a roughly 45-degree angle toward an upper right corner of the frame by the first motor rotating the first motor wheel in the first rotational direction, and the second motor preventing the second motor wheel from rotating.

5. The automated moving target apparatus of claim 1, wherein:

the first and second motors are capable of moving the at least one target at a roughly 45-degree angle toward a lower right corner of the frame by the first motor preventing the first motor wheel from rotating, and the second motor rotating the second motor wheel in the first rotational direction; and the first and second motors are capable of moving the at least one target at a roughly 45-degree angle toward a lower left corner of the frame by the first motor rotating the first motor wheel in the second rotational direction, and the second motor preventing the second motor wheel from rotating.

6. The automated moving target apparatus of claim 1, wherein the pivot arm is pivotally engaged with the upper end of the vertical drivetrain bar.

7. The automated moving target apparatus of claim 6, wherein:

the at least one target is engaged with a distal end of the pivot arm; and an opposing proximal end of the pivot arm is pivotally engaged with a pivot bracket provided by the upper end of the vertical drivetrain bar.

8. The automated moving target apparatus of claim 7, wherein the pivot bracket is configured for allowing the position of the pivot arm—and, in turn, the at least one target—to be angularly adjusted between 0 and 180 degrees relative to the upper end of the vertical drivetrain bar.

9. The automated moving target apparatus of claim 7, wherein the pivot bracket provides a quick-release pin configured for selectively locking the angular position of the pivot arm relative to the upper end of the vertical drivetrain bar.

10. The automated moving target apparatus of claim 1, further comprising a cover sized and configured for wrapping around and engaging the frame.

11. The automated moving target apparatus of claim 10, wherein the cover is constructed out of a bulletproof material.

12. The automated moving target apparatus of claim 10, wherein the cover comprises an insulated, heat reflective shell.

13. The automated moving target apparatus of claim 1, further comprising a controller comprising an electronics enclosure and a circuit panel that is powered by a power source and configured to control rapid and precise movements of the at least one target along each of the X-axis and Y-axis via the first motor and second motor.

14. The automated moving target apparatus of claim 13, wherein the controller is further configured to randomize the rapid and precise movements of the of the at least one target along each of the X-axis and Y-axis via the first motor and second motor.

15. The automated moving target apparatus of claim 13, wherein the controller further comprises a plurality of manual control buttons that are connected to the circuit panel and externally exposed along an exterior surface of the electronics enclosure.

16. The automated moving target apparatus of claim 13, wherein the circuit panel comprises a printed circuit board, a wireless communication circuit that is configured to receive wireless control signals, and a processing unit configured to execute control instructions to control the rapid and precise movements of the at least one target along each of the X-axis and Y-axis via the first motor and second motor.

17. The automated moving target apparatus of claim 13, further comprising a rechargeable battery and a battery pack dock that is mounted to the frame, wherein the rechargeable battery is encapsulated within the battery pack dock and is configured to provide electric power to the controller during use of the apparatus.

18. The automated moving target apparatus of claim 1, wherein the frame provides a plurality of casters positioned and configured for allowing the apparatus to be more easily transported when not in use.

19. An automated moving target apparatus comprising:
a frame;
a drivetrain assembly engaged with the frame, the drivetrain assembly comprising:
  a first motor mounted to the frame in a position proximal to a right side of the frame, the first motor providing a first motor wheel capable of selectively rotating in each of a first rotational direction and an opposing second rotational direction;
  a second motor mounted to the frame in a position proximal to a laterally opposing left side of the frame, the second motor providing a second motor wheel capable of selectively rotating in each of the first and second rotational directions;
  a substantially horizontally oriented lateral drivetrain bar extending between the first motor and the second motor;
  a carrier slidably engaged with the lateral drivetrain bar and configured for slidably traversing along the lateral drivetrain bar between the first motor and the second motor;
  a substantially vertically oriented vertical drivetrain bar slidably engaged with the carrier, such that the vertical drivetrain bar is oriented substantially transverse to the lateral drivetrain bar and configured for slidably traversing relative to the carrier in a substantially vertical direction;
  each of an upper end and an opposing lower end of the vertical drivetrain bar providing an at least one pulley, and the carrier providing at least four pulleys, said pulleys being positioned in a vertically oriented plane in which the first motor wheel and second motor wheel are also positioned; and
  a continuous belt engaged about each of the pulleys along with the first motor wheel and second motor wheel in series;
a pivot arm engaged with the upper end of the vertical drivetrain bar, the pivot arm providing an at least one target engaged therewith; and
a cover sized and configured for wrapping around and engaging the frame;
whereby, the first motor and second motor are capable of cooperating, via the belt, to selectively move the pivot arm—and, in turn, the at least one target—along each of a substantially horizontally oriented X-axis and a substantially vertically oriented Y-axis relative to the frame by rotating the respective first and second motor wheels.

20. An automated moving target apparatus comprising:
a frame;
a drivetrain assembly engaged with the frame, the drivetrain assembly comprising:
  a first motor mounted to the frame in a position proximal to a right side of the frame, the first motor providing a first motor wheel capable of selectively rotating in each of a first rotational direction and an opposing second rotational direction;
  a second motor mounted to the frame in a position proximal to a laterally opposing left side of the frame, the second motor providing a second motor wheel capable of selectively rotating in each of the first and second rotational directions;
  a substantially horizontally oriented lateral drivetrain bar extending between the first motor and the second motor;
  a carrier slidably engaged with the lateral drivetrain bar and configured for slidably traversing along the lateral drivetrain bar between the first motor and the second motor;
  a substantially vertically oriented vertical drivetrain bar slidably engaged with the carrier, such that the vertical drivetrain bar is oriented substantially transverse to the lateral drivetrain bar and configured for slidably traversing relative to the carrier in a substantially vertical direction;
  each of an upper end and an opposing lower end of the vertical drivetrain bar providing an at least one pulley, and the carrier providing at least four pulleys, said pulleys being positioned in a vertically oriented plane in which the first motor wheel and second motor wheel are also positioned; and
  a continuous belt engaged about each of the pulleys along with the first motor wheel and second motor wheel in series;
a pivot arm pivotally engaged proximally with the upper end of the vertical drivetrain bar; and
an at least one target engaged with a distal end of the pivot arm;
whereby, the first motor and second motor are capable of cooperating, via the belt, to selectively move the pivot arm—and, in turn, the at least one target—along each of a substantially horizontally oriented X-axis and a substantially vertically oriented Y-axis relative to the frame by rotating the respective first and second motor wheels.

* * * * *